United States Patent
Miyakawa

[15] 3,695,157
[45] Oct. 3, 1972

[54] CAMERA CONTROLS
[72] Inventor: Seinan Miyakawa, Tokyo, Japan
[73] Assignee: Asahi Kogaku Kogyo Kabushiki Kaisha, Tokyo-to, Japan
[22] Filed: April 14, 1970
[21] Appl. No.: 28,457

[30] Foreign Application Priority Data
April 17, 1969 Japan ...................44/30093

[52] U.S. Cl. .............................................95/10 CT
[51] Int. Cl. ...............................................G03b 7/08
[58] Field of Search ......................................95/10 C

[56] References Cited
UNITED STATES PATENTS

| | | | |
|---|---|---|---|
| 3,455,227 | 7/1969 | Sato et al. | 95/10 |
| 3,533,348 | 10/1970 | Yamagi | 95/10 |
| 3,324,779 | 6/1967 | Nobusawa et al. | 95/10 C |
| 3,347,141 | 10/1967 | Nobusawa et al. | 95/10 C |
| 3,470,798 | 10/1969 | Miyakawa | 95/10 C |

Primary Examiner—Samuel S. Matthews
Assistant Examiner—Michael L. Gellner
Attorney—Steinberg & Blake

[57] ABSTRACT

A camera capable of determining exposure time automatically in accordance with exposure-determining factors of film speed, aperture size, and object brightness. Upon opening of the shutter of the camera, to commence an exposure, a control capacitor starts its charging and discharging operations. This control capacitor is in series with a memory capacitor to which signals of the exposure-determining factors are transmitted. Both of these capacitors coact with a shutter-closing mechanism which is actuated in accordance with the signals transmitted to the memory capacitor for closing the shutter to terminate the exposure after an exposure time which is correct for the particular signals transmitted to the memory capacitor.

9 Claims, 7 Drawing Figures

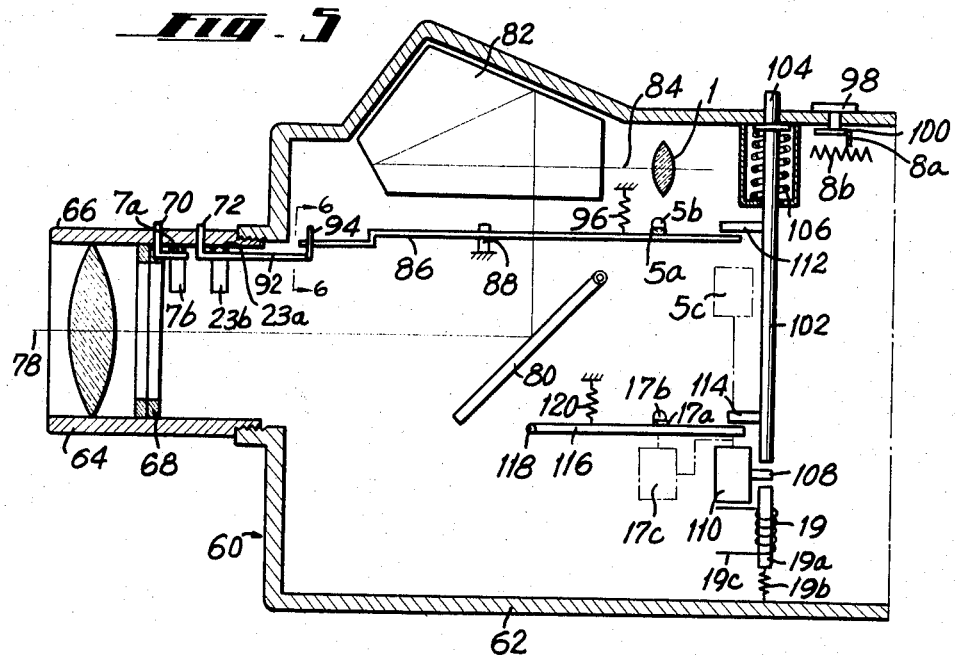
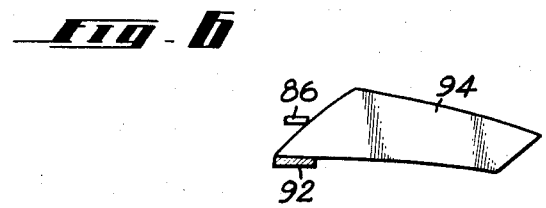
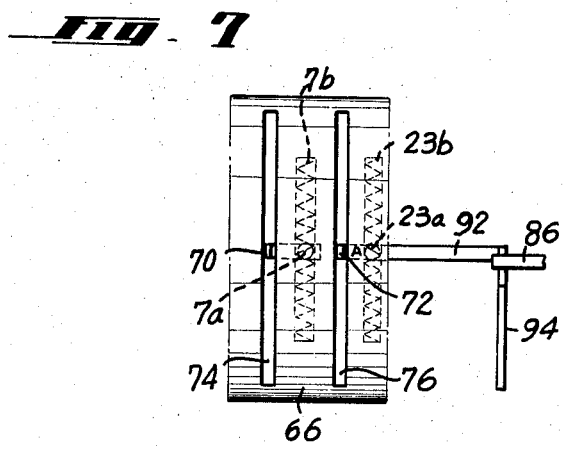

CAMERA CONTROLS

BACKGROUND OF THE INVENTION

The present invention relates to cameras.

In particular, the present invention relates to camera controls which are capable of determining the exposure time in harmony with other factors such as the film speed, the size of the exposure aperture, and the illuminating conditions.

As is well-known, it is possible to control the exposure time in accordance with an electrical signal which corresponds to the brightness of the object which is photographed. For this purpose light from the object which is photographed is sensed by a photosensitive element such as a suitable photoconductor. In addition to this particular signal which corresponds to the object brightness, it is necessary to add such exposure-determining factors as the speed of the film which is exposed and the size of the exposure aperture. These latter factors must also be converted into electrical signals, in the same way as the electrical signal which corresponds to object brightness.

It is well-established that the influence which is exerted by these exposure-determining factors on the actual exposure of the film varies in accordance with the variation of the exposure-determining factors according to a geometric progression having a common ratio of 2. Thus, it is conventional to add together the various exposure-determining factors in such a way that each electrical signal is transformed into a signal value which is logarithmically compressed with respect to the actual signal. The resultant logarithmically compressed signals are added together. In order to determine the exposure time, the logarithmically compressed composite signal is then logarithmically expanded into a signal which varies according to a geometric progression having the common ratio 2, in the same way as the actual exposure-determining factors. This inversely transformed signal is then applied to a timing capacitor in order to determine the exposure time.

These conventional exposure-time determining controls require extremely complex circuits, so that they are of considerable disadvantage. A very complicated structure is required for the time control circuit, as well as for the logarithmic compression and logarithmic expansion circuits, not to mention the information memorizing circuit in the case of a single lens reflex camera which is capable of measuring the intensity of the light from the object internally of the camera itself after the light passes through the objective. These are among the various problems involved at the present time in conventional constructions of this type. The necessity of providing a logarithmic expansion circuit is particularly troublesome.

SUMMARY OF THE INVENTION

It is accordingly a primary object of the present invention to provide a construction of the above type which will be capable of accomplishing the desired results with circuitry and structure far simpler than has heretofore been possible without in any way sacrificing the precision and the quality of the operations.

In particular it is an object of the invention to provide a circuitry and structure which will enable logarithmic expansion circuits to be completely eliminated.

It is also an object of the present invention to provide a construction of this type which can readily be used optionally with manual determination of exposure time instead of automatic exposure time determination.

Furthermore, it is an object of the invention to provide a construction of this type which readily lends itself to use with a single lens reflex camera where the object brightness is sensed internally of the camera after the light passes through the objective thereof.

In addition, it is an object of the invention to provide a construction which is capable of very efficiently compensating for temperature variations so that it is possible to minimize any inaccuracies which might result from temperature fluctuations.

According to the invention, the shutter of the camera is capable of being opened by a shutter-opening means so as to commence an exposure. The exposure is terminated by a shutter-closing means which functions to close the shutter and thus terminate the exposure. A control capacitor means is actuated by the shutter-opening means to commence charging and discharging operations of the control capacitor means in synchronism with the opening of the shutter. A memory capacitor means is connected in series with the control capacitor means and the shutter-closing means to store the exposure-determining information. This latter information is transmitted to the memory capacitor means by a signal-transmitting means which transmits information such as the size of the exposure aperture and the film speed, as well as object brightness, in the form of a logarithmically compressed signal which is received by the memory capacitor means. The control capacitor means together with the memory capacitor means and the shutter-closing means all coact with each other to provide for automatic closing of the shutter after an exposure time which is correct for the particular exposure-determining factors encountered in any given instance.

Thus, according to the invention an arrangement which is considerably simplified as compared to conventional arrangements is provided in order to determine the exposure time utilizing logarithmically compressed composite signals. The invention has circuitry made up in part of diodes and capacitors which function to determine the controls as well as to memorize the various exposure-determining factors. However, the structure of the invention can be readily operated to determine the exposure time manually. The control capacitor means is charged or discharged through a diode in synchronism with the shutter-opening operation, with a constantvoltage circuit controlling this latter capacitor means. A memory capacitor means is charged according to the logarithmically compressed composite signal made up of the electrical signals of object illumination, film speed, and aperture size. These two capacitor means are connected in series within the circuit of the shutter-closing means which is made up, according to one embodiment of the invention, of a high input impedance transistor switching circuit which controls the flow of current to a solenoid which, when energized, will bring about closing of the shutter and termination of the exposure.

BRIEF DESCRIPTION OF DRAWINGS

The invention is illustrated by way of example in the accompanying drawings which form part of this application and in which:

FIG. 5 is a fragmentary partly sectional schematic illustration of the manner in which various components can be mechanically interrelated;

FIG. 6 is a schematic transverse section taken along line 6—6 of FIG. 5 in the direction of the arrows and showing one way in which it is possible to introduce manual exposure-time determination; and FIG. 7 is a fragmentary schematic top plan view showing in developed form part of the objective where the exposure-time and aperture-determining controls are situated.

DESCRIPTION OF PREFERRED EMBODIMENT

Figure 1:
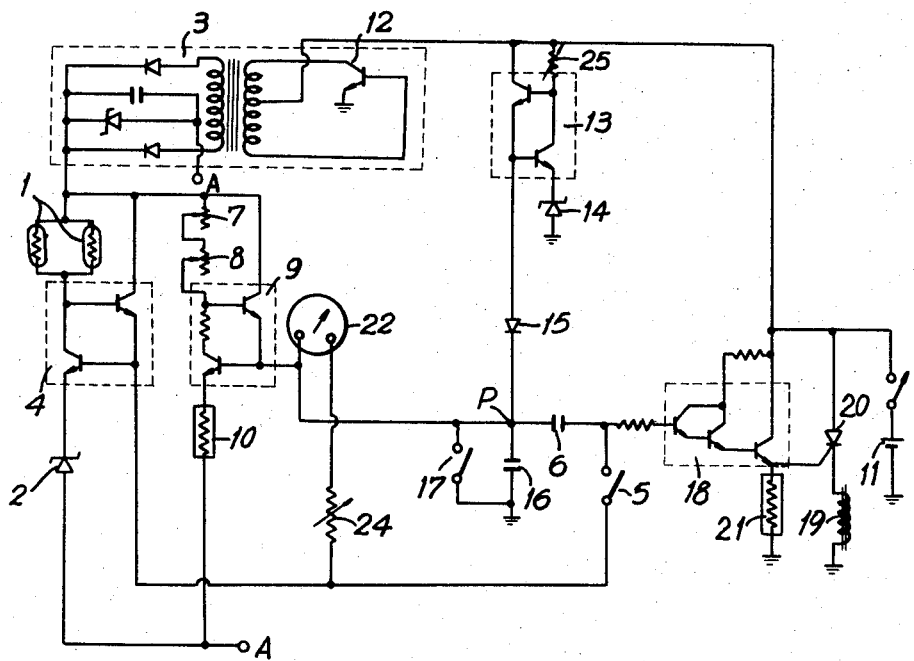
FIG. 1 is a wiring diagram of one embodiment of the invention.

Referring to FIG. 1, there is illustrated at the left thereof a photosensitive means in form of a photoconductor 1 which receives light from the object and thus is a light-responsive element. It may be placed internally within the camera to receive light which has passed through the objective thereof, or it may be situated so as to receive light which is external to the objective of the camera. This photoconductor 1 is electrically connected with a diode 2 which serves as an element for logarithmically compressing the signal. The diode 2 is situated in the output circuit of the current-source section 3 of the illustrated electrical circuitry. Thus, it will be seen that the diode 2 is in series with the photoconductor 1. A back-coupling amplifying transistor assembly 4 is provided with the control electrodes of the transistors connected to the junctions of the photoconductor 1 and the diode 2. The output terminal of the transistor assembly 4 is connected through a normally closed switch 5 to one terminal of a memory capacitor means 6. The switch 5 is opened upon opening of the shutter, actually immediately before the shutter is tripped so as to commence the exposure. Thus, it will be seen that the structure thus far described forms a signal-transmitting means for transmitting to one of the terminals of the memory capacitor means 6 a logarithmically compressed signal of the object brightness.

In parallel with the above-described circuit for transmitting the signal of object illumination, there is another circuit forming part of this signal transmitting means and functioning to transmit another logarithmically compressed signal. This part of the circuitry includes a variable resistor 7 which is adjusted in accordance with the size of the exposure aperture. Thus, when the diaphragm is adjusted, the variable resistor 7 is also adjusted so as to provide an electrical signal corresponding to the size of the exposure aperture. The circuit also includes a variable resistor 8 which is adjusted according to the film speed. Thus, when the film is introduced into the camera, the operator will set an index along a scale of film speeds so as to correspond to the speed of the film which is used, and this will automatically place the variable resistor 8 in a position providing an electrical signal corresponding to the film speed. These exposure-determining factors of aperture size and film speed are transmitted through back-coupling amplifying transistors 9 similar to the transistors 4, and it will be noted that the variable resistors 7 and 8 are situated between the control electrodes of the back-coupling amplifying transistor assembly 9. The circuit also includes a temperature-compensating resistor 10. It is to be noted that the diode 2 and the resistor 10 are connected to a junction A which is common to the current-source section 3. The output of this part of the signal-transmitting means, which is to say the output from the transistor assembly 9, is connected to the other of the terminals of the memory capacitor means 6. Thus, one of the terminals of the memory capacitor means 6 receives a logarithmically compressed signal of the object brightness while the other of the terminals receives a logarithmically compressed composite signal of the diaphragm setting and film speed.

As is shown at the right portion of FIG. 1, a battery 11 provides a current source serving as the primary input current source for a converter formed by a transistor vibrator 12 of the current-source section 3. This battery 11 also serves, under the control of a constant-voltage control circuit formed by transistor 13 and diode 14, as the current source for the control capacitor means 16 which is connected to the constant-voltage circuit 13, 14 through the diode 15. In the illustrated example the diode 15 and the capacitor 16 are connected in series. The junction P of the diode 15 and control capacitor means 16 is connected to that terminal of the memory capacitor means 6 which receives the logarithmically compressed composite signal of diaphragm and film speed set-tings.

The control capacitor means 16 is connected in parallel with a normally closed switch 17 which is opened synchronously with opening of the shutter. A high input impedance transistor switching circuit is formed by Darlington connection transistors 18 which has the control electrode thereof connected to that terminal of the capacitor 6 which receives the logarithmically compressed signal of object brightness. The output of the switching circuit 18 is connected to the control electrode of a silicon controlled recifier (SCR) 20 which is connected in series with the solenoid 19 in the current-supply circuit thereof, the battery 11 serving as the current source as pointed out above. Thus, the electromagnet 19 together with the switching circuit 18 and the SCR 20 form a shutter-closing means for closing the shutter when the solenoid 19 becomes energized, as pointed out in greater detail below. This part of the circuit is provided with a temperature-compensating resistor 21.

The circuit is also provided with an exposure-time indicating electric meter 22 capable of being adjusted by a variable resistor 24 and connected in parallel with the memory capacitor means 6. The variable resistor 23 is shown in FIG. 1 connected to its own source E which is grounded as illustrated. Thus, it is possible to provide a manual control for the capacitor 6 according to the output voltage of the potentiometer 23 instead of providing an automatic charge through the switch 5, when manual operation is desired. The separate source E for the potentiometer 23 is grounded as illustrated to avoid influence of the potentiometer 23 on capacitor 16 when the switch 17 is opened.

Figure 2:
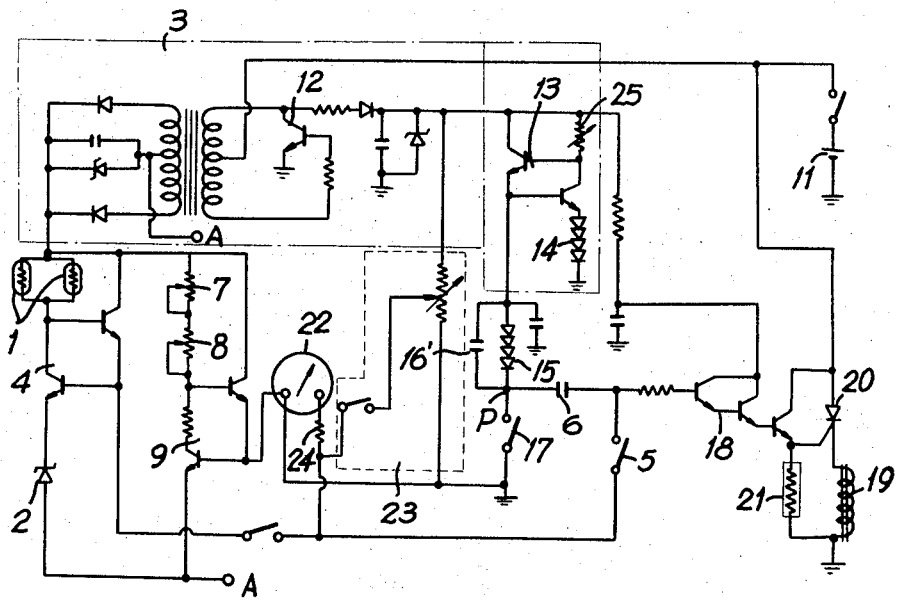
FIG. 2 is a wiring diagram of another embodiment of the invention.

According to the embodiment of the invention which is illustrated in FIG.2, the control capacitor means 16' is connected in parallel with the diode 15 which is under the control of the constant-voltage circuit 13. A manual-exposure-time setting device 23 is formed in this embodiment by a circuit for adjusting the charging voltage of the memory capacitor means 6. Otherwise, the embodiment of FIG.2 is the same as that as FIG.1 and the corresponding elements which function the same way are designated by the same reference characters.

Figure 3:
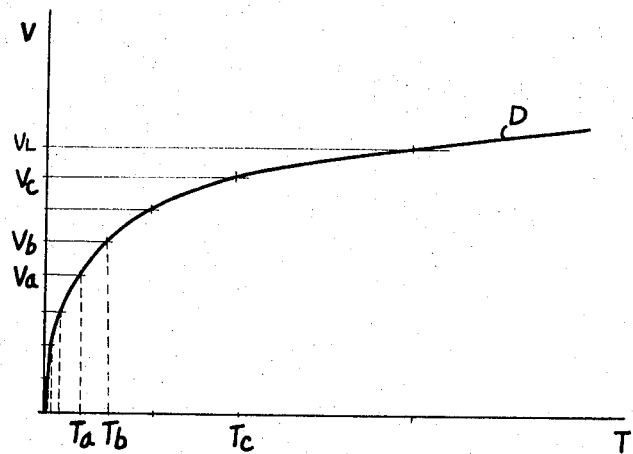
FIG. 3 is a graph illustrating the operating characteristics of the control capacitor means.

Referring now to FIG.3, the graph illustrated therein shows a characteristic charging curve D of the control capacitor means 16. The ordinate of the illustrated graph has a scale of voltage values V at the junction P, so that this voltage corresponds to the voltage across the memory capacitor means 6 charged according to the logarithmically compressed signals as described above. The abscissa has a scale of time values T.

The operation of the structure thusfar described above is as follows:

According to the embodiment of FIG.1, the factor of brightness of the object which is photographed is determined in accordance with the light sensed by the photoconductor assembly 1. The signal thereof undergoes the logarithmically compressing operation of the diode 2 and appears at the output terminal of the back-coupling amplifying transistors 4 as a logarithmically compressed signal which is applied through the normally closed switch 5 to one of the terminals of the memory capacitor means 6. Simultaneously, another logarithmically compressed signal, determined according to the setting of the variable resistor 7, as determined by the setting of the diaphragm, and also according to the setting of the variable resistor 8, adjusted according to the film speed, is applied from the output terminal of the back-coupling transistors 9 to the other terminal of the memory capacitor means 6.

At this time, in the circuit which includes the diode 15 and the control capacitor means 16 connected in series with each other according to the embodiment of FIG.1, the capacitor means 16 is in a discharged condition due to the fact that the normally closed switch 17 is connected in parallel and at this time the junction P is negatively biased by the current source battery 11. In this latter connection it is to be noted that two power sources 3 and 12 are used. The source 3 is used only for storing information in the memory capacitor means 6, while the source 12 is used as a power source for timing operation and relay operation. The voltage at the point P is negative in the sense that this voltage is the ground or earth voltage of the power source 12. On the other hand, the voltage transmitted to the point P from the power source 3 is positive or negative (zero voltage) in accordance with the particular information which is transmitted. Generally, the voltage at the point P is negative (equal to the electric potential at the cathode of the power source 3). When the switch 17 remains closed, the voltage at the point P is in accordance with the electric potential of the cathode of the power source 12 for the control capacitor means 16 in the timing circuit, and thus the voltage at the point P is referred to as being negative. Accordingly, the capacitor means 6 is charged at its terminal which receives the signal through the normally closed switch 5 as the positive electrode due to the differential voltage between the two signals of the current-source section 3, and in addition this terminal connected to the switch 5 is also charged as a positive electrode due to the current-source battery 11. At this time the Darlington connection transistors 18 are in a low output state, so that the SCR 20 controlled by the output signal of the transistors 18 is kept in a non-conductive state, and accordingly the solenoid 19 remains unenergized since no current is transmitted thereto. As a result, the shutter is prevented from being closed and is in a condition where it is ready to be opened.

A shutter-opening means, described below in connection with FIG.5, is actuated to initiate the exposure by tripping the shutter so that it will open, and at this time the normally closed switch 5 is opened. In predetermined timed relation therewith, the normally closed switch 17 is also opened. As a result, the transmission of the logarithmically compressed signal to the memory capacitor means 6 is terminated. Instead, the charging and discharging operation of the control capacitor means 16 commences simultaneously with the opening of the shutter. Under the constant-voltage control circuit 13 and through the diode 15, the capacitor means 16 starts to be charged by the current-source battery 11. The charging current is controlled by the voltage-current operation of the diode 15. Thus, the constant-voltage control circuit 13 and the diode 15 form a charge-control means electrically connected to the control capacitor means 16 for regulating the change in the charge thereof. As the capacitor 16 is charged, the voltage of the junction P varies with time T in the manner illustrated by the curve D of FIG.3.

When the voltage across the terminals of the capacitor means 6 is Va due to the logarithmically compressed signal, or, in other words, when the voltage of the junction P has increased along the curve D up to the value Va, the positive bias of the memory capacitor means 6 is increased and the resulting voltage across the terminals thereof renders conductive the Darlington connection transistors 18 which have been non-conductive up to this time. Accordingly, the positive voltage at the output terminal of the transistors 18 is applied to the control electrode of the SCR 20 so as to make the latter conductive with the result that current begins to be transmitted to the electromagnet 19. As a result, the solenoid 19 becomes energized and brings about closing of the shutter which up to this time has been prevented from closing.

Assuming that the rise of voltage at the junction P, and thus of the voltage across the terminals of the control capacitor means 16, up to the value Va requires the time Ta, then the duration during which the shutter remains opening, or, in other words, the exposure time, is determined according to this time Ta. Thus, when the voltage across the terminals of the memory capacitor means 6, due to the composite signal of the two logarithmically compressed signals based on the exposure-determining factors is Vb or Vc, then the exposure time can be controlled according to the time Tb or Tc, required for the voltage to rise to these values, respectively, across the terminals of the control capacitor means 16. Thus, it may be assumed that a voltage $V_1$ is initially stored at the capacitor 6 corresponding to the information transmitted thereto. Then the switch 5 is opened. At this time the point P is connected to the ground of the power source 13 through the switch 17. Upon opening of the switch 17 the electric current flows from the power source 13 through the diode 15 to the capacitor 16 which is thus charged. The voltage between the terminals of the capacitor 16 increases during charging thereof. Thus the voltage at the point P also rises. The manner in which the latter voltage rises is illustrated by the curve D in FIG. 3. The voltage to be impressed on the base of transistor 18 is the sum of the voltage $V_1$ at the capacitor 6 and the variable voltage V. When the sum reaches a predetermined level, electric current flows through the transistor circuit 18. On the other hand, in the event that the voltage $V_L$ shown in FIG. 3 reaches a predetermined trigger level, and the voltage $V_1$ at the capacitor 16 corresponding to the information is $(V_L - V_a)$, then electric current will flow to the transistor circuit 18 when the capacitor is charged to such an extent that the voltage V increases to $V_a$. Accordingly if $V_1$ is equal to $(V_L - V_c)$, then the current will start to flow in the circuit when V becomes $V_c$. The time $T_a$, $T_b$ .... for which the voltage V reaches these values such as $V_a$, $V_b$ .... is the exposure time. As is apparent from the characteristic operating curve of FIG.3, the exposure-time control is in accordance with a geometric progression having a common ratio of 2 relative to the composite signal corresponding to the logarithmically compressed exposure-determining factors. As a result of experiments which have been carried out, it is clear that the time control can be carried out according to the geometric progression having the common ratio 2 through a wide range corresponding to a wide range in the variation of the composite signal made up of the various exposure-determining factors.

During the above operation when the normally closed switch 5 is opened just prior to tripping of the shutter, the operating circuit section is separated from the logarithmically compressed signal output circuit operating in response to object brightness and the capacitor means 6 operates as an information-storing or memorizing capacitor. Accordingly, this construction lends itself to use with an internally-situated light-receiving and measuring system for a single lens reflex camera to carry out proper exposure time controls.

In addition, it is possible to provide an arrangement according to which the normally closed switch 5 is opened independently of shutter release and the capacitor means 6 may be charged according to manually-selected information by manually operating the device 23 so as to bring about the proper exposure-time control in the same way as in the above-described automatic system.

The electric meter 22 which is connected in parallel with the capacitor means 6 enables the operator to see what the exposure time actually is prior to release of the shutter. The deflection of the pointer of the meter 22 is in response to the voltage across the terminals of the memory capacitor means 6, or, in other words, the input voltage of the meter 22 over the exposure-time scale will indicate the exposure time to the operator.

With the embodiment of FIG.2, as was the case with the embodiment of FIG.1, the signals corresponding to the exposure-determining factors are memorized as a charge on the capacitor means 6, while the capacitor means 16' is charged with a voltage under control of the constant-voltage control circuit which contains the transistor 13 and the diode 14. Thus, the point P acts as a negative biasing point of the capacitor means 6. When, in this state, the switches 5 and 17 are open in timed relation with shutter release operation, the control capacitor means 16' is discharged through the diode 15. The discharge current is controlled by the voltage-current characteristic of the diode 15. Thus, in this case also the constant-voltage control circuit and the diode 15 form a charge-control means electrically connected with the control capacitor means 16 for regulating the change in the charge thereof. The voltage of the point P of one of the terminals of the discharging capacitor means 16' varies with time along the curve D of FIG.3 as described above. Thus, in exactly the same manner as described in connection with the embodiment of FIG.1, due to the discharge of the capacitor means 16', the positive bias of the capacitor means 6, which has previously memorized the signal corresponding to object brightness, film speed, and aperture size, rises so that through the operation of the Darlington connection transistors 18 and the control electrode diode 20, the current will start to flow through the electromagnet or solenoid 19 so as to initiate the closing of the shutter. The exposure-time control referred to above in connection with FIG.2 is thus the same as that of FIG.1.

The characteristics of the diode 15 and the voltage applied to the diode 15 are initially adjusted to suitable values by adjustment of the variable resistor 25 so that the voltage variation is in the manner of an arithmetic progression relative to object brightness variation as derived from the photocurrent corresponding to the object brightness sensed by the photoconductor 1 and controlled by the transistors 4 and the diode 2, corresponding to the voltage variation of the junction P which has the arithmetic progression indicated by the scale Va, Vb, Vc, .... of FIG.3. Thus, while object brightness varies in a geometric progression with a common ratio 2, the information voltage is treated as a voltage varying according to equal increments. In other words when object brightness varies according to a progression 2, 4, 8, 16 .... the information voltage varies according to the arithmetic progression 1, 2, 3, 4 .... Therefore, it is possible to reduce to a very large extent the range of change of information voltage.

Thus, with the structure of the invention, a control capacitor means whose charging and discharging operations are under the constant-voltage control of the circuit 13 as well as under the control of the diode 15 and the memory capacitor means 6 charged by the logarithmically compressed signal based upon the exposure-determining information are both connected in series with the high impedance input circuit 18 for control of the transistor switching circuit which forms part of the shutter-closing means. The voltage across the terminals of the control capacitor means 16 causes the bias point of the memorizing capacitor means 6 to be shifted. The charging and discharging operations of the control capacitor means 16 are controlled by the voltage-current characteristic of the diode 15 connected in series therewith according to FIG.1 or in parallel therewith according to FIG.2. Accordingly, it is possible to completely eliminate the conventional inverse logarithmic transformation circuit, which is to say, the logarithmically expanding circuit conventionally required. In addition, the function of the memorizing capacitor means 6 is such that it lends itself to use with internally situated light-receiving photoconductors. Also, it is possible to carry out exposure-time through manual selection by using the device 23. Thus, the great practical advantage of the present invention resides in the fact that the structure is exceedingly simple while maintaining all of the highly important functions referred to above.

As may be seen from FIG. 1, that terminal of memory capacitor means 6 to which the signal-transmitting means is connected through the switch 5 is also connected to the high input impedance transistor means 18, the signal-transmitting means also being electrically connected with the control capacitor means 16 and through the timing switch 17 to the grounded pole of the power source.

The same is true of FIG. 2 where the high input impedance transistor means 18 is connected to that pole of the memory capacitor means 6 to which the signal-transmitting means is connected through the switch 5. Also in FIG. 2 it will be noted that that terminal of the memory capacitor means which is electrically connected to the control capacitor means 16' is connected to ground through the timing switch 17.

In a case where a circuit utilizes semiconductor elements, it is necessary to consider the influence of temperature, and it will be noted that the temperature compensating resistors 10 and 21 are provided as described above. These temperature compensating resistors serve to reduce the influence of temperature on the circuit.

Figure 4:
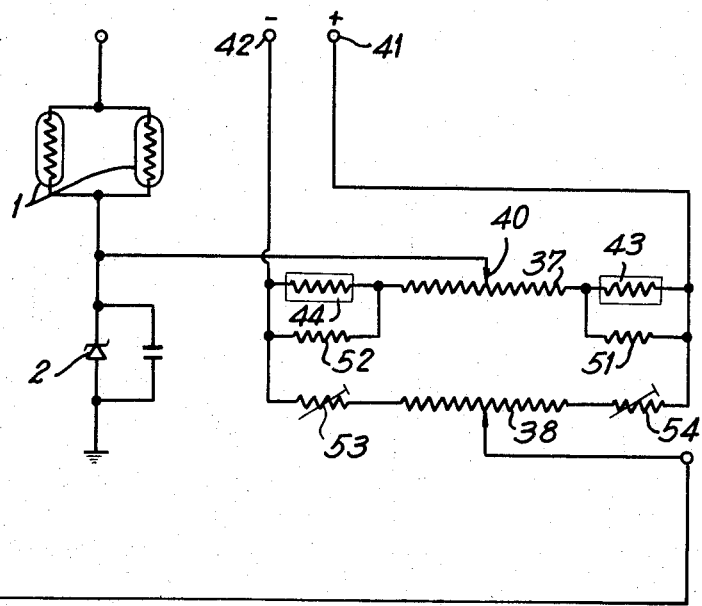
FIG. 4 is a wiring diagram of yet another embodiment of a circuit according to the invention.
Figure 4:
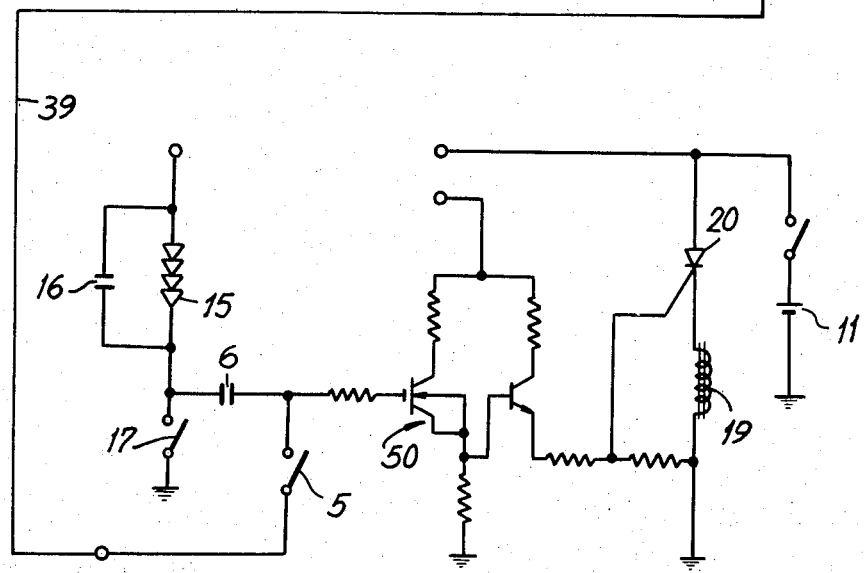

However, the arrangement of FIG.4 provides an improved circuit with respect to temperature compensation.

Referring to FIG.4, the circuit illustrated therein includes potentiometers 37 and 38 corresponding to the variable resistors 7 and 8 referred to above. Those elements of FIG.4 which correspond in function to those of FIGS.1 and 2 are indicated by the same reference characters. The most important variation of the circuit of FIG.4 as compared with that of FIGS.1 and 2 resides in the fact that the signal-transmitting means transmits a signal of all of the exposure-determining factors combined to a single terminal of the memory capacitor means 6. Thus, the object brightness signal from the photoconductors 1 and the diode 2, the aperture size determined by the potentiometer 37 and the film speed determined by the potentiometer 38 are all transmitted through the single conductor 39 to the one terminal of the memory capacitor means 6 through the normally closed switch 5.

In addition, it will be noted that the potentiometer 37, which replaces the variable resistor 7, has a slider 40 which receives a voltage based upon the brightness of the object. Thus, in this case, the object brightness signal is transmitted directly to the slider 40 of the potentiometer 37. The power source from the transformer has a positive electrode 41 and a negative electrode 42. Between the potentiometer 37 and the positive electrode 41 of the power source is inserted a semiconductor, such as a resistance element 43, having a positive temperature coefficient of resistance, e.g., a posistor (positive characteristic thermistor). Between the potentiometer 37 and the negative electrode 42 of the power source is inserted a semiconductor, such as a thermistor 44 having a negative coefficient of resistance. This is the arrangement shown in FIG.4. However, under certain circumstances, the positions of the semiconductors 43 and 44 may be reversed.

The high input impedance circuit 18 is replaced in the embodiment of FIG.4 with a field effect transistor (FET) 50. The diodes 2 and 15 usually have a positive temperature coefficient of resistance. The FET has a negative temperature coefficient of resistance. Therefore, when the FET 50 is operated by voltage according to the various items of information controlled by the diodes 2 and 15, undesirable changes in the signals caused by the influence of temperature on the diode 2 and the FET 50 respectively compensate each other so that the signal which is ultimately obtained is almost free from the influence of temperature. Thus, the FET 50 is highly desirable as an element to be used in response to the signal controlled by a diode.

In actual practice, the amounts of change of signal caused by the influence of temperature on an diode and on a FET are not always equal. Thus, the amount of increase of the signal by a diode influenced by temperature is not always equal to the amount of decrease of the signal by the FET as influenced by the same temperature, and therefore the sum of the increase and decrease may not precisely compensate each other. It is, however, possible to select a diode and a an FET which will fulfill the above conditions by making an extremely careful selection of these components.

However, the use of a diode and the FET 50 will result in the reduction of the change of the signal as resulting from the influence of temperature variations. In order to further reduce the amount of change in response to temperature variation, it is possible to use the above semiconductors 43 or 44 either in the illustrated arrangement or in a reversed arrangement as referred to above. If the reduced amount of change in signal is caused by a positive temperature coefficient of resistance, then an arrangement as shown in FIG.4 is provided. On the other hand, if it is caused by a negative temperature coefficient of resistance, then the semiconductors 43 and 44 are reversed. These semiconductors 43 and 44 have their operations adjusted by resistors 51 and 52, respectively. In addition, it will be noted that the potentiometer 38 is connected between variable adjusting resistors 53 and 54. Thus, the selection of the arrangement of elements 43 and 44 as shown in FIG.4 or the reversed arrangement will be determined according to the temperature coefficient of resistance of the diode and the FET 50 which is used.

Thus, with the circuit of FIG.4, a negative element and a positive element are used at both ends of the potentiometer 37 in order to have the voltage acting on the ends of the potentiometer increased or decreased by temperature variations to equal extents. When the voltage at one electrode of the potentiometer is changed by a temperature variation, the slider of the potentiometer will move from this electrode toward the other electrode. Each position to which the slider moves is particularly influenced by the voltage as changed by the temperature. Therefore, the circuit of FIG. 4 is highly suitable for a proper operation of the potentiometer.

FIGS. 5–7 illustrate in a schematic manner how components referred to above, such as those of the embodiment of FIG. 1, are physically arranged in a camera so as to provide the required mechanical coaction between the various components. Thus, referring to FIG. 5 it will be seen that this structure is schematically illustrated as forming part of a single lens reflex camera 60 having a housing 62 which carries an objective 64. The tubular casing 66 of the schematically illustrated objective carries a diaphragm 68 which can have its aperture adjusted by manual setting of component 70. The objective also carries at its casing 66 a manual adjustable exposure-time setting component 72. As is apparent from FIG. 7 the components 70 and 72 are movable along slots 74 and 76, respectively, which are formed in the wall of the tubular objective casing 66. In the position shown in FIG. 7 the exposure-time setting member 72 is in alignment with a letter A indicating the automatic position. It can be displaced however along the slot 76 to a selected location along a scale of exposure times. The manually movable element 70 is movable along the slot 74 to a selected graduation of a scale of f-stop numbers. The diaphragm adjusting member 70 is fixed with a slider 7a which moves along the resistor 7b carried by the casing 66 at its interior, so that in this way the components 7a, 7b will form the variable resistor 7 shown in FIG. 1. The element 72 carries a slider 23a which moves along a resistor 23b, so that these components 23a, 23b form the potentiometer of the device 23 for manual selection of the exposure time. When the component 72 is set in the automatic position indicated in FIG. 7 of course the components 23a, 23b are spaced from each other so that the structure operates automatically in the manner described above.

In the illustrated single lens camera 60, the light from the object travels through the objective 64 along the optical axis 78 to be reflected by the tiltable mirror 80 to the prism 82 of the conventional view finder, and from the prism 82 the light travels along the axis 84 through the assembly carrying the photoconductors 1, so that in this way the photoconductors 1 are situated internally within the camera to receive the light which has passed through the objective.

The normally closed switch 5 includes a movable switch element 5a and a stationary switch element 5b. Movable switch element 5a is mounted on a lever 86 which is supported on a pivot 88 in any suitable way. A spring 96 urges the lever 86 in a counterclockwise direction about the pivot 88 so as to seek to maintain the contact 5a engaging the contact 5b.

The component 72 is carried by an elongated arm 92 which not only carries the slider 23a but which also carries a cam 94 the configuration of which is most clearly apparent from FIG. 6. The lever 86 is in the path of movement of the cam 94, so that when the operator moves the component 72 beyond the automatic position shown in FIG. 7 in order to manually select an exposure time, the upper camming edge of the cam 94 will engage the lever 86 and turn it in a clockwise direction, as viewed in FIG. 5, in opposition to the spring 96 so as to displace the contact 5a away from the contact 5b, and in this way the switch 5 is automatically opened when the exposure time is manually selected.

The camera housing 62 carries at its upper wall a rotary knob 98 which has an index capable of being situated along the scale of film speeds, such as ASA values, and this knob 98 is fixed to a rotary disc 100 situated within the camera and turning with the knob 98. Disc 100 carries a slider 8a which moves along a resistor 8b, so that in this way the variable resistor 8 is set to a value corresponding to the film speed.

The shutter opening means includes an elongated shutter-actuating plunger 102 having an upper end 104 accessible to the operator. A spring 106 urges the plunger 102 of the shutter-opening means to the rest position illustrated in FIG. 5. The bottom end of the plunger 102 coacts with a shutter-tripping lever 108 which forms part of the shutter 110 schematically illustrated in FIG. 5. Actually the shutter 110 will in the single lens reflex camera take the form of a focal plane curtain shutter which is tripped when the lever 108 is displaced by the plunger 102.

The plunger 102 carries a pair of projections 112 and 114. The projection 112 is situated over the right end of the lever 86, as viewed in FIG. 5, so that when the plunger 102 is depressed to open the shutter the lever 86 is turned in a clockwise direction to open the switch 5 in the manner described above.

The projection 114 is situated over a lever 116 supported for pivotal movement on a pivot 118 and urged in a counterclockwise direction by a spring 120. This lever 116 carries a movable contact 17a which coacts with a stationary contact 17b, these elements 17a, 17b forming the switch 17. Thus, in this way with the opening of the shutter the switches 5 and 17 are opened in a predetermined timed relation.

FIG. 5 illustrates schematically a holding relay assembly 17c actuated from the shutter 110 and coacting with the lever 116 to hold the switch 17 in its open position, even after the plunger 102 is released by the operator, until the lever 108 is returned to the shutter-closing position. In the same way FIG. 5 schematically illustrates a holding relay assembly 5c coacting with the lever 86 and controlled from the shutter assembly 110 to maintain the switch 5 open, irrespective of release of the plunger 102, until the shutter is closed.

In order to close the shutter, as was described above, current is supplied to the solenoid 19 which is schematically illustrated in FIG. 5 with its armature 19a urged to the illustrated rest position by a spring 19b. When the coil 19c of the solenoid 19 receives current in the manner described above, so as to energize the solenoid, the armature 19a will be displaced to return the lever 108 to its initial position, thus closing the shutter.

Thus, FIGS. 5–7 illustrated in a schematic manner one of the many different possible ways in which it is possible to physically arrange the components of the invention.

What is claimed is:

1. In a camera having a shutter, shutter-opening means coacting with the camera shutter for opening the latter to commence an exposure, shutter-closing means coacting with the camera shutter for closing the latter to terminate the exposure, control capacitor means coacting with said shutter-opening means for commencing charging and discharging operations in synchronism with the opening of the shutter, memory capacitor means connected in series with said control capacitor means and said shutter-closing means for storing exposure-determining information, signal-transmitting means coacting with said memory capacitor means for transmitting to the latter signals of exposure-determining factors, and charge-control means electrically connected with said control capacitor means for regulating the change in the charge thereof, both of said capacitor means and said shutter-closing means coacting with each other to close the shutter after an exposure time which will provide correct exposure for the particular exposure-determining factors transmitted to said memory capacitor means by said signal-transmitting means, said charge-control means including a constant-voltage circuit means and a diode electrically connected with said control capacitor means for regulating the operation thereof when the shutter is opened.

2. The combination of claim 1 and wherein said control capacitor means and diode are in series.

3. The combination of claim 1 and wherein said control capacitor means and diode are in parallel.

4. The combination of claim 1 and wherein said signal-transmitting means is electrically connected to said memory capacitor means for transmitting thereto signals of object brightness, film speed, and aperture size, in the form of a logarithmically compressed composite signal, and said charge-control means being electrically connected with said control capacitor means for regulating the change in the charge thereof according to an arithmetic progression.

5. The combination of claim 4 and wherein said memory capacitor means has two terminals, said signal-transmitting means being electrically connected with one of said terminals for transmitting a logarithmically compressed signal of object brightness to said one of said terminals and said signal-transmitting means being electrically connected to the other of said terminals for transmitting a logarithmically compressed signal of aperture and film speed to the other of said terminals.

6. The combination of claim 5 and wherein a high input impedance transistor means has an input pole electrically connected to said one terminal of said memory capacitor means, a timing switch being electrically connected with said control capacitor means, and a pole of a power source being electrically connected to said timing switch, said signal-transmitting means being electrically connected to the latter pole through said timing switch, and said signal-transmitting means also being connected electrically to one terminal of said control capacitor means.

7. The combination of claim 4 and wherein said memory capacitor means has two terminals, said signal-transmitting means being electrically connected with one of said terminals for transmitting the entire composite logarithmically compressed signal of the exposure-determining factors to said one of said terminals and said control capacitor means being electrically connected to the other of said terminals.

8. The combination of claim 7 and wherein a high input impedance transistor means has an input pole electrically connected to said one terminal of said memory capacitor means, a timing switch being electrically connected with said other terminal of said memory capacitor means, said switch being grounded so that through the latter switch said other terminal of said memory capacitor means which is electrically connected with said control capacitor means is connected to ground.

9. In a camera having a shutter, shutter opening means coacting with the camera shutter for opening the latter to commence an exposure, shutter closing means coacting with the camera shutter for closing the latter to terminate the exposure, control capacitor means coacting with said shutter-opening means for commencing charging and discharging operations in synchronism with the opening of the shutter, memory capacitor means connected in series with said control capacitor means and said shutter-closing means for storing exposure-determining information, and signal-transmitting means coacting with said memory capacitor means for transmitting to the latter signals of exposure-determining factors, both of said capacitor means and said shutter-closing means coacting with each other to close the shutter after an exposure time which will provide correct exposure for the particular exposure-determining factors transmitted to said memory capacitor means by said signal-transmitting means, said signal-transmitting means including a potentiometer adjusted according to aperture size, said potentiometer having a slider, and said signal-transmitting means transmitting to said slider a voltage in accordance with object brightness, a power source having positive and negative electrodes between which said potentiometer is located, and a pair of semiconductors having, respectively, positive and negative temperature coefficients of resistance, said potentiometer being situated between and connected in series with said semiconductors and each of the latter being situated between said potentiometer and one of the electrodes of the power source, respectively.

* * * * *